United States Patent [19]

Celaya et al.

[11] Patent Number: 5,085,839
[45] Date of Patent: Feb. 4, 1992

[54] APPARATUS FOR THE PREVENTION OF ACID GAS EXCURSIONS

[75] Inventors: David E. Scott; Phillip Celaya, both of Houston; Brent A. McCune, Seabrook; Tom A. Wellborn, Houston, all of Tex.

[73] Assignee: Lyondell Petrochemical Company, Houston, Tex.

[21] Appl. No.: 690,380

[22] Filed: Apr. 23, 1991

Related U.S. Application Data

[63] Continuation of Ser. No. 461,613, Jan. 8, 1990, abandoned.

[51] Int. Cl.$^5$ .................. C01B 17/16; C01B 31/20
[52] U.S. Cl. .................. 423/210; 422/111; 422/168; 423/228; 423/229; 423/DIG. 5; 423/DIG. 6
[58] Field of Search ......... 423/210, 228, 229, DIG. 5, 423/DIG. 6

[56] References Cited

U.S. PATENT DOCUMENTS

| | | | |
|---|---|---|---|
| 3,961,015 | 6/1976 | Dailey | 423/229 |
| 4,466,946 | 8/1984 | Goddin et al. | 423/228 |
| 4,529,411 | 7/1985 | Goddin et al. | 55/16 |
| 4,561,864 | 12/1985 | Klass et al. | 55/16 |
| 4,798,910 | 6/1989 | Herrin | 423/228 |

OTHER PUBLICATIONS

"Hydrocarbon Treating" published by the Gas Processor Suppliers Association, Section 21, Book vol. II, 10th Ed. 1987.

"New Correlations Enhance Value of Monoethanolamine Process" published by The Oil and Gas Journal, vol. 64, No. 43, 10/24/66.

*Primary Examiner*—Wayne A. Langel
*Attorney, Agent, or Firm*—Arnold, White & Durkee

[57] ABSTRACT

An improved acid gas recovery system is provided which has particular application in reducing the incidence of sulfide and other acid gas excursions. The present invention addresses the disadvantages of prior absorption techniques by closely monitoring and maintaining a reaction zone temperature profile within a contactor to improve and control the reaction between acid gas components and the aqueous amine absorbent. The temperature profile is maintained by frequently adjusting relative flow rates of the feed gas and lean amine in the process which in turn reduces the incidence of excursions.

16 Claims, 3 Drawing Sheets

APPARATUS FOR THE PREVENTION OF ACID GAS EXCURSIONS

This application is a continuation of application Ser. No. 461,613 filed Jan. 8, 1990, abandoned.

TECHNICAL FIELD

The present invention relates generally to methods and apparatus for sweetening gaseous streams. More particularly, the invention pertains to methods and apparatus for removing acid gases such as hydrogen sulfide and carbon dioxide from gaseous streams. The invention is especially concerned with the control and abatement of environmentally undesirable emissions from acid gas removal systems.

BACKGROUND OF THE INVENTION

Many natural gases and refinery gases from hydrotreating processes contain acid gas components, commonly called "sour" gas components, which form an acidic aqueous solution. It is common to treat or "sweeten" sour gas by removing the sour gas components, hydrogen sulfide ($H_2S$) and carbon dioxide ($CO_2$). The sweetening is almost always required to meet sales and/or environmental specifications.

Hydrogen sulfide is a toxic gas that must be removed to extreme low concentrations (less than 100 ppm) prior to pipeline delivery or burning. Also, when mixed with free water, $H_2S$ forms a weak acid that can cause corrosion. Carbon dioxide is a non-toxic inert gas. Carbon dioxide, as such, is harmless in dry natural gas, but when mixed with free water will form weak acid and also cause corrosion.

There are generally two types of gas treating processes: (a) absorption and (b) adsorption. The latter involves the removal of a substance from a gas stream by physical binding on the surface of a solid material. In the former process, the gas stream contacts a liquid that selectively removes a substance. The most common absorption process used in gas sweetening is the amine process. The liquid absorbent is a mixture of water and a chemical amine, usually monoethanolamine (MEA) or diethanolamine (DEA). Occasionally, other alkanolamines such as triethanolamine (TEA), diglycolamine (DGA), methyldiethanolamine (MDEA), diisopropanolamine (DIPA), or mixtures of these solutions with one another are employed. Also, other treating solutions such as sulfinol have been employed. Sometimes corrosion inhibitors, anti-foaming agents and/or other special additives are added to the aqueous absorbent solution to improve process efficiencies.

Amines remove carbon dioxide and hydrogen sulfide from a sour gas by a chemical reaction that changes the chemical form of both the amine and the acid gas components. The reaction changes the acid gases into a liquid form which is separated from the acid-free gas or sweetened gas. The chemical reaction between the amine (called lean amine at the start of the process) and acid gases is exothermic, i.e., it gives off heat, when the reaction takes place.

Amine contactors (also called absorbers or scrubbers) are commonly used in absorption gas treatment processes. The purpose of an amine contactor is to contact a gas stream containing hydrogen and/or hydrocarbons with an aqueous amine solution so that the amine removes undesired acid gases from the gas stream. In general, the sweet residue gas flows out the top of a contactor and the reacted amine (also called rich amine) flows out the bottom. Thus, the source gas stream and the aqueous amine flow counter-currently to one another. This counterflow contact maximizes interphasal surface area as well as the concentration gradient between the amine and acid gas reactants. Generally, amine contactors may contain discreet stages, e.g., trays or plate columns, or else have no discreet stages, e.g., spray towers or packed columns.

The flow rate of the amine in the absorption process must be constantly monitored and adjusted based on several factors including: (1) acid gas concentration of the source gas stream, (2) flow rate of the source gas stream, and (3) the degree to which the amine solution has been regenerated, and (4) the amount of acid gas per unit of amine reactant (often called amine loading). Failure to closely monitor these parameters often results in undesired levels of acid gas components in the residue gas. When this residue gas is a refinery gas, which is subsequently burned for fuel, environmentally unacceptable excursions of acid gas components occur.

One method of reducing the incidence of excursions or undesired acid gas concentrations has been to check periodically the acid gas content of the gas exiting the contactor using a Draeger and to adjust the amine flow rate accordingly. Thus, the flow has been increased if the hydrogen sulfide or other acid gas content has been too high. This, however, has had a disadvantage in that once high concentrations of acid gas have been detected, usually some acid gases have already been released into the exiting gas. This method has had a further disadvantage that the amine circulation has often been set to maintain sufficient sweetening at the highest acid gas concentrations, which can result in costly overcirculation and overloading or liquid flooding of the regeneration system during normal operation.

A second method of reducing the incidence of excursions has involved controlling amine flow rate by preselecting the ratio of amine to sour gas. However, intermittent variations in both acid gas and amine concentration often alter the preselected ratio. This method, therefore, has had the same disadvantages discussed above, including excursions and increased operating cost.

A third method has employed an automated control system to adjust the amine flow as required to maintain a desired temperature on a predetermined tray or position in the contactor. This method, however, does not accommodate changes in the temperatures of the streams entering and exiting the tower and thus is also subject to undesired excursions of acid gas components.

There continues to be a need for an improved method for effectively and efficiently controlling the reaction between acid gases and amine absorbents in acid gas removal systems.

SUMMARY OF THE INVENTION

The present invention provides an improved acid gas absorption method and apparatus which has particular application in reducing the incidence of sulfide and other acid gas excursions. The present invention addresses the disadvantages of prior absorption techniques by closely monitoring and maintaining a reaction zone temperature profile within a contactor to improve and control the reaction between acid gas components and the aqueous amine absorbent. The temperature profile is maintained by frequently adjusting relative flow rates of the feed gas and lean amine in the process which in turn reduces the incidence of excursions.

The present invention takes advantage of the exothermic nature of the reaction between amine absorbents and acid gas components. The reaction occurs when the amine absorbs acid gas component(s) from the sour feed gas. This reaction liberates heat, so that the temperature within a contactor increases in the area where the reaction is taking place. When the relative flow rates of the amine and sour gas are correct, it has been discovered that a temperature profile having a relatively hot central portion and relatively cool end portions is defined at a location or position within the contactor spaced from the upper and lower ends thereof. It has further been discovered that variations in the optimal relative amine/gas flow, such as under- or over-circulating the amine, tends to result in a movement of the reaction zone temperature profile. When the amine is under-circulated, the profile moves toward the top of the contactor, resulting in an increased incidence of acid gas excursions. Similarly, a profile located near the very bottom of the contactor can correlate with unnecessarily high amine circulation.

The present invention takes advantage of these discoveries by calculating the temperature differences between several key locations in the contactor, and adjusting the relative amine/gas flow rates to hold the desired temperature difference. A resulting advantage of the invention is that it enables the use of minimal rates of amine. This, in turn, reduces operating cost and helps to avoid overloading the amine regeneration system. The invention also insures that the amine rate does not fall below the minimal rates.

According to the present invention, an amine contactor, having at least three temperature sensors at separately spaced points along and within the contactor, is employed in conjunction with control means operable to adjust the flow rate of the amine in the contactor relative to the gas flow rate in response to signals from the temperature sensors. Any known technology for detecting temperature may be employed in the present invention such as thermocouples, resistance temperature detectors (RTDs), and the like.

It is a primary focus of the present invention to minimize the amine circulation through the contactor to only what is actually necessary to hold H₂S and other acid gases in check and to give operations personnel a graphic temperature profile of the contactor so that contactor loadings can be determined on a continuous basis. This will offer the operations personnel the ability to anticipate excessive loadings on the contactor that may cause an H₂S or other gas excursion.

The relative flow rates of the amine and sour gas are varied to maintain a temperature profile having a relatively hot central portion and relatively cool end portions at a location or position spaced from the upper and lower ends of the contactor. Appropriate monitoring of the profile position allows both proper amine loading and reduced incidence of acid gas excursions. The relative flow rates of the amino and acid gas may be varied by varying the amino rate, the gas rate, or both.

The installation of temperature sensors in a contactor according to the invention will allow "closed-loop" amine rate control to help insure sufficient amine to remove all acid gas components from the feed gas while at the same time conserving amine use. This is an improvement over previous "open-loop" amine rate control methods, such as the draeger technique mentioned above, in which the amine rate is not continuously adjusted. The present invention will accommodate changes in the composition and temperature of the lean amine, and changes in the rate, acid gas composition and temperature of the sour feed gas without the need for a rigorous on-line process model to set the appropriate amine flow rate. In addition to the above advantages, it is contemplated that the present invention will help conserve amine absorbent in hydrotreating processes, improve amine regeneration efficiency, reduce amine circulation rates (and therefore amine losses), and help insure optimum allocation of lean amine capacity.

The temperature profile for any given gas/amine treating system may be expected to vary somewhat with individual gas mixtures, acid gas content, amine type and concentration, and type of contactor employed. In general, however, it has been observed that the temperature within a given contactor ranges between about 100° and 200° F., with a peak temperature of between about 40° and 60° F. greater than the temperature of the feed gas. Advantageously, the present invention does not require absolute temperatures, but uses relative temperatures to control the reaction rate. However, it is preferred that the temperature proximate each end of the profile should be at least about 3° F. lower than the peak temperature, to be used for control purposes. Also, the temperature proximate the upper end of the profile is preferably not less than about 10° F. lower than the peak temperature or central portion of the profile.

It is contemplated that data from the several temperature sensors, together with data on the flow rates of the gas and the amine solutions, be monitored manually, or preferably sent to a computer. The computer may then be programmed to:

1. Monitor the relative flow rates of the gas and amine within the contactor.

2. Calculate the temperature difference between selected locations within the contactor and compare the value obtained with a desired temperature difference.

3. Adjust the relative flow rates of the gas and amine to maintain the desired temperature difference or profile.

These and other objects and advantages of the present invention will become apparent to those skilled in the art upon reading the following detailed description of a preferred embodiment together with the following figures.

DETAILED DESCRIPTION

Figure 1:
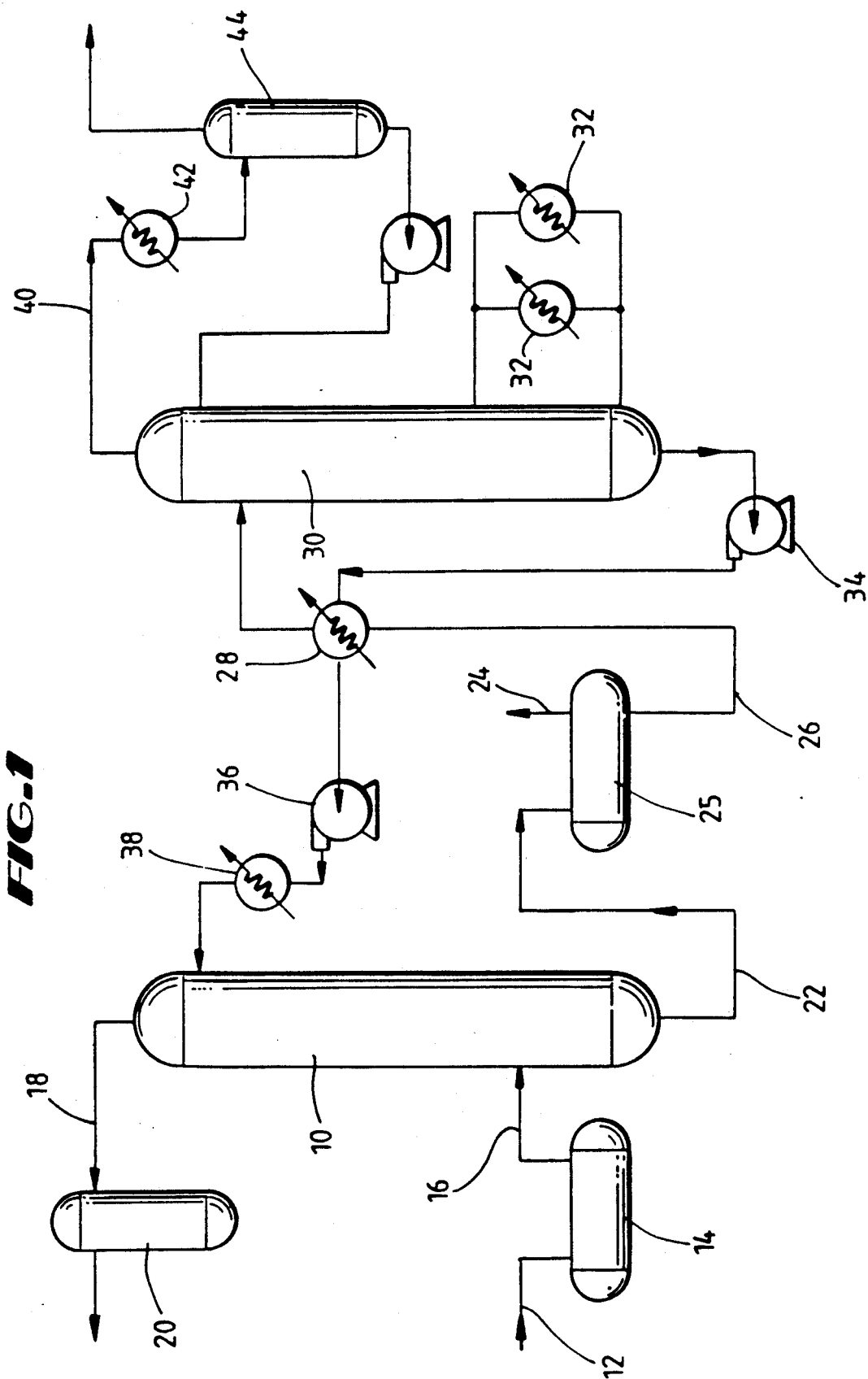
FIG. 1 is a flow diagram of a typical amine absorption sour gas treatment process.

A general process flow diagram for an alkanolamine acid gas removal plant is shown in FIG. 1. The basic arrangement may vary somewhat for different amine solutions, as, for example, some designs incorporate multiple feeds and contactor sections.

Sour gas (such as natural gas, refinery off-gas, and the like) enters through conduit 12 into an inlet separator 14 for the removal of liquids and/or solids. From the separator 14, the gas stream enters the bottom of the contactor 10 through conduit 16 where it contacts a lean amine solution flowing down from the top of the column. The acid gas components in the gas react with the amine to form a reversible salt. As the gas continues to pass up the contactor 10, more acid gases chemically react with the amine. The sweetened gas leaves the top of the contactor via conduit 18 and passes through an outlet separator 20 to catch any amine solution which may be carried over.

Rich amine solution leaves the contactor 10 via conduit 22 and flows through a flash tank 25 to remove absorbed hydrocarbons which exit through conduit 24. From the flash tank 25, the rich solution passes via conduit 26 through the rich/lean heat exchanger 28 where heat is absorbed from the lean solution. The heated rich amine goes to the top portion of the regenerator 30. As the solution flows down the column toward the reboilers 32, it is stripped of $H_2S$ and $CO_2$. The amine solution leaves the bottom of the regenerator 30 as lean solution. This lean solution is then passed through a pump 34 to the rich/lean heat exchanger 28 and pumped again (36) to a solution cooler 38 to reduce the lean solution temperature to approximately 10° F. warmer than the inlet gas temperature to stay above the hydrocarbon dew point. At this point, the lean solution is returned to the contactor 10 to repeat the cycle.

Acid gas stripped from the amine passes out of the top of the regenerator 30 through conduit 40. It goes through a condenser 42 and a separator 44 to cool the stream and recover water. The recovered water is usually returned to the regenerator 30 as reflux. The acid gas exits the top of the outlet separator 44 and, depending on composition and quantity, may be used in various ways. For example, it may be vented, incinerated, sent to sulfur recovery facilities, compressed for sale, or reinjected into an oil reservoir in an enhanced oil recovery projects.

Figure 2:
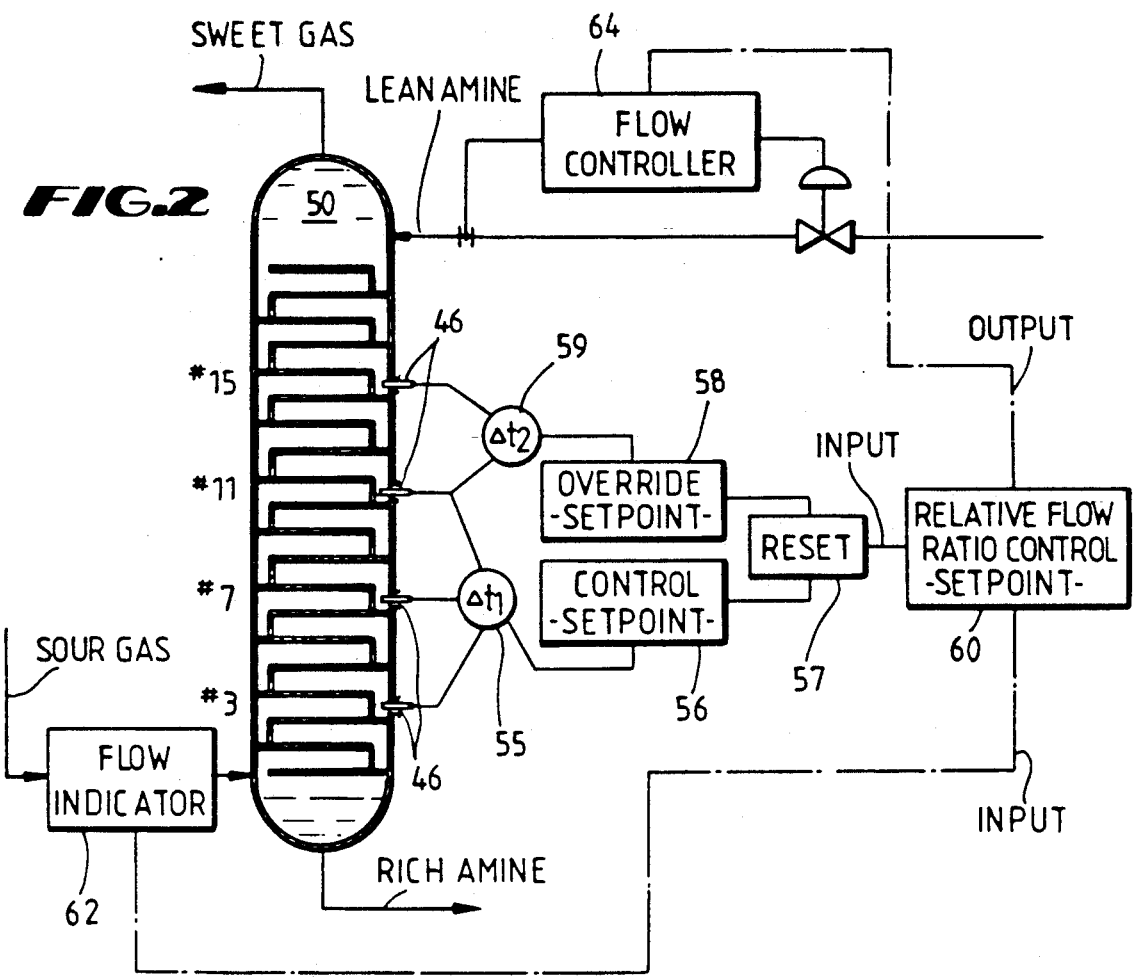
FIG. 2 is an interior schematic representation of an amine contactor and a two-tier control scheme according to a preferred embodiment of the present invention.
Figure 3:
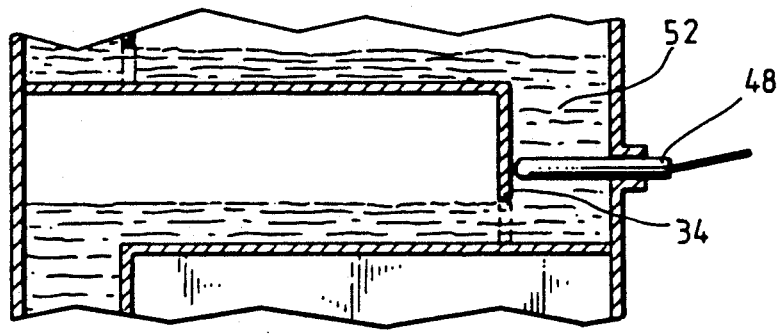
FIG. 3 is an enlarged schematic view of a thermocouple placement in the contactor of FIG. 2.

The present invention may be adapted to an acid gas removal system as schematically shown in FIG. 2. In the preferred embodiment, a twenty tray contactor 50 is fitted with four thermocouples 46 at selected points within the contactor 50. As shown in FIG. 3, a thermocouple 48 is positioned in a liquid space 52 adjacent to a downcomer 54 to maximize heat transfer. Thermocouple placement may be selected on the basis of data collected during a survey of the contactor. The temperatures of each tray within the contactor are recorded using a contact pyrometer or the like while concomitantly reducing the amine flow rate gradually until a breakthrough or excursion of acid gas occurs. The thermocouples are then positioned such that a reaction zone temperature profile can be monitored in a location which optimizes the sweetening process and preferably minimizes amine circulating. The critical tray locations (or positions in a contactor having non-discreet stages) for any set of actual conditions can be determined by those skilled in the art by conducting a similar survey.

Continuing in FIG. 2, the thermocouples 46 are positioned adjacent to trays #3, #7, #11, and #15. In the preferred embodiment, the thermocouples 46 are connected to a computer control system. The differential $T_1$ temperature control block 56 takes the tray #11 temperature and subtracts the tray #3 temperature in order to obtain the differential $T_1$ temperature measurement 55. This is preferably done about once every ten seconds. The control block 56 takes this calculated measurement and utilizes it as the controller measurement. The controller output signal 57 is transmitted to the ratio controller control block 60 where the flow ratio control set-point is reset. The ratio controller 60 transmits its output signal to the lean amine flow controller 64 where its set-point is reset, therefore adjusting the amine rate in order to maintain the requested differential temperature set-point. Preferably, the flow controller adjusts the amine rate about three times per second. The control action uses proportional, integral and derivative tuning parameters.

Similarly, the differential $T_2$ temperature control block 58 takes the tray #11 temperature and subtracts the tray #15 temperature in order to obtain the differential $T_2$ temperature measurement 59. In periods of high acid gas loading, the ratio calculated by the block 56 may be too low to contain potential excursions. In this instance, the differential $T_2$ block 58 will be used as an override to reset the ratio setpoint 60.

In the preferred embodiment the ratio computer controller 60 set-point will be automatically adjusted by the differential temperature controller 57, however the set-point should be monitored at regular basis so that any irregularities in operation can be detected quickly. Preferably, a check status condition is incorporated to verify to make sure that the differential temperature controller is on control, otherwise this loop will not stay on computer control. This loop will not operate if a constraint is violated on the differential temperature control block; therefore, if there is a problem that will not let the differential temperature controller stay on, the ratio controller will be returned to operator control.

The ratio computer controller 60 is designed to take the lean amine flow rate and divide by the amount of gas flowing through the contactor in order to calculate the ratio of amine solution to total sour gas in barrels per hour/thousand cu. ft. hour. Preferably, the sour gas flow indicator 62 measures the sour gas flow rate about once every 10 seconds. The differential temperature controller output signal 57 resets the ratio controller set-point as is necessary to hold the desired differential temperature set point. The ratio controller's output signal will, in turn, reset the lean amine flow controller 64 set-point to adjust the amine rate to hold the desired differential temperature across the contactor control zone 55.

Using a two-tier computer control scheme as outlined above, the software for maintaining a contactor temperature profile may comprise, for example, the following Proportional-Integral-Derivative (PID) control algorithims:

PID VELOCITY ALGORITHM

OUPUT = GAIN* (TRMPRO+TRMINT+TRMDER)
GAIN = CONTROLLER GAIN TUNING PARAMETER
TRMPRO = SETPNT - MEASUR-ERROR1
TRMINT = DELTA* (SETPNT-MEASUR) INTGRL
TRMDER = DERIV* ((2*MESUR1)-MESUR-MESUR2)/DELTAT
SETPNT = CONTROLLER SETPOINT
MEASUR = CURRENT VALUE OF CONTROLLER MEASUREMENT

ERROR1 = CONTROLLER ERROR AT LAST CONTROL CYCLE
MESUR1 = CONTROLLER MEASUREMENT AT LAST CONTROL CYCLE
MESUR2 = CONTROLLER MEASUREMENT FROM 2 CONTROL CYCLES IN THE PAST
DELTAT = CONTROLLER EXECUTION FREQUENTLY
INTGRL = CONTROLLER INTEGRAL TUNING PARAMETER
DERIV = CONTROLLER DERIVATIVE TUNING PARAMETER

The following example is presented to describe preferred embodiments and uses of the present invention but should not be construed as limiting the claims thereof.

EXAMPLE

1. Survey

A survey was conducted on a 20 tray recycle gas DEA contactor (Bechtel, San Francisco) in order to determine a temperature profile on the tower in response to lean amine solution rate changes. The amine solution employed was an aqueous solution of about 20–25% diethanolamine and other minor constituents having an entrance temperature of about 123° F. The sour gas flow rate was monitored at about 3700 thousand cubic feet per hour (MSCFH) and at a temperature of about 105° F. The temperature at each tray downcomer was measured using a portable contact pyrometer while varying the amine flow rate between 520 and 490 barrels per hour (B/H).

Figure 4:
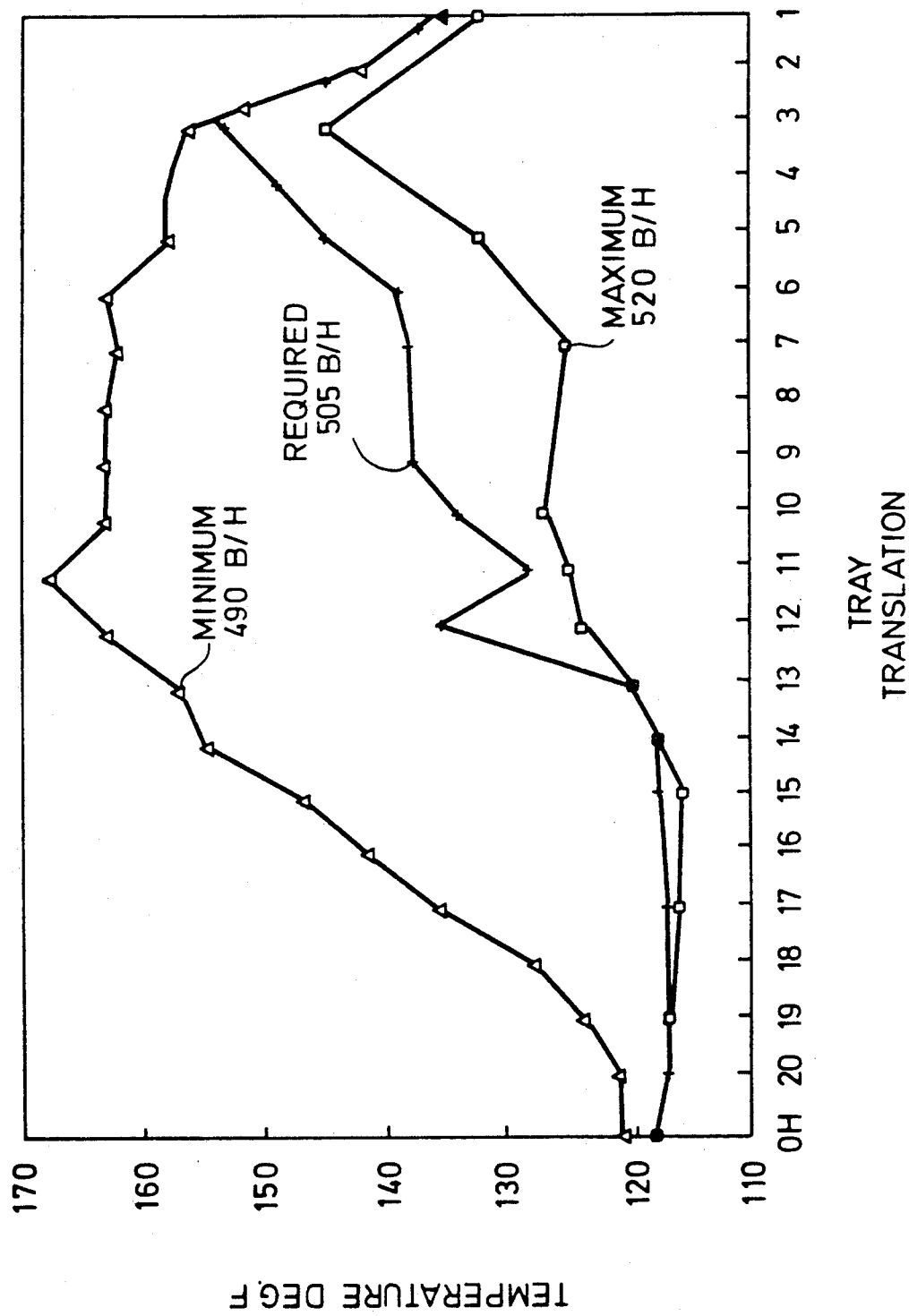
FIG. 4 is a graphic representation of three temperature profiles observed in a survey conducted on a twenty tray contactor.

As shown in FIG. 4, the data indicated that with high DEA circulation rates (520 B/H), the rise in temperature was restricted to the bottom of the tower with the bulge at tray #3. The total DEA circulation was decreased in a series of step changes to 505 B/H and then to 490 B/H while holding hydrogen sulfide excursions in check.

2. Thermocouple Placement

Based on the profile data of FIG. 4., four thermocouple locations were selected at trays #3, #7, #11, and #15, respectively. Four 2" raised faced flange nozzles were installed at the selected trays, and flanged the mowells were inserted into these nozzles. The well material was 3/16 stainless steel with carbon steel flanges. The insertion dimension used was 19.5". Thermocouples inserted into the wells were ¼" diameter, stainless steel sheath, type J, grounded junction thermocouples. These thermocouples were terminated to a Honeywell low-level multiplexer process interface unit.

3. Control Run

After the thermocouples were installed and the control unit assembled, the loop was turned on and a control differential temperature set point between trays #11 and #3 was set at 3° F., and an override differential temperature set point between trays #11 and #15 was set at 10.0° F. A 26% lean DEA solution at 114.5° F. entered the top of the contactor. The sour gas entered the bottom of the contactor at a rate of approximately 1315 MSCFH. The temperatures monitored at trays #15, #11, #7, and #3 were 140.2°, 163.7°, 167.6-20, and 161.0° F., respectively. Based on these temperatures, the control differential temperature was calculated as 2.7° F., and the DEA/gas ratio set point was calculated at 0.094. The flow controller adjusted the lean DEA flow rate to 168.6 B/H in response to the DEA/gas ratio set point. The following tables set forth the various constituents of the recycle gas before entering the contactor and after exiting the contactor.

TABLE 1

| Recycle Gas Before Contactor | | |
|---|---|---|
| Component Name | Mole % Amount | Net BTU |
| Hydrogen | 83.356 | 228.4 |
| C5+ | .547 | 19.7 |
| Propane | 2.355 | 54.5 |
| Isobutane | .270 | 8.1 |
| N-Butane | .217 | 6.5 |
| H2S | .062 | .4 |
| Isopentane | .147 | 5.4 |
| N-Pentane | .214 | 7.9 |
| Ethane | 2.898 | 46.9 |
| Oxygen | 0.000 | 0.0 |
| Nitrogen | .180 | 0.0 |
| Methane | 9.748 | 88.6 |

TABLE 2

| Recycle Gas After Contactor | | |
|---|---|---|
| Component Name | Mole % Amount | Net BTU |
| Hydrogen | 84.206 | 230.7 |
| C5+ | .231 | 8.3 |
| CO2 | .025 | 0.0 |
| Propane | 2.014 | 46.6 |
| Isobutane | .193 | 5.8 |
| N-Butane | .100 | 3.0 |
| Isopentane | .060 | 2.2 |
| N-Pentane | .105 | 3.9 |
| Ethane | 2.774 | 44.9 |
| Nitrogen | .036 | 0.0 |
| Methane | 10.255 | 93.2 |

Although the present invention has been described in terms of specific embodiments, it is anticipated that alterations and modifications thereof will no doubt become apparent to those skilled in the art. It is therefore intended that the following claimed be interpreted as covering all such alterations and modifications as fall within the true spirit and scope of the invention.

What is claimed is:

1. A process for reducing the concentration of an acid gas component of a gas stream comprising:
    a) countercurrently contacting a gas stream containing an acid gas with a stream of an aqueous amine in a vessel under conditions to create an exothermic zone of reaction within the vessel;
    b) monitoring the temperature within said vessel at each of at least three separate points spaced along the vessel to detect the location of said zone in said vessel; and
    c) controlling the flow of the amine relative to the gas in said vessel in response to the temperature monitored at said points to maintain a temperature profile along said zone such that the temperature proximate the middle of said zone is higher than the temperatures at the ends of said zone.

2. The process of claim 1 wherein the acid gases are selectively absorbed by countercurrent contact with an aqueous solution containing an alkanolamine.

3. The process of claim 2 wherein the alkanolamine is monoethanolamine, diethanolamine, triethanolamine, diglycol-amine, methyldiethanolamine, diisopropylamine, or mixtures thereof.

4. A method of controlling an exothermic deacidification process in which an aqueous amine is contacted with a feed gas containing an acid gas in a vertically disposed absorber to absorb acid gases from the feed gas, and wherein the amine enters the upper end of the absorber and exits the lower end of the absorber, and the feed gas enters the lower end of the absorber and exits the upper end of the absorber, which method comprises:

a) monitoring temperatures within the absorber at least three points spaced along the absorber intermediate the upper and lower ends to detect a reaction zone between the amine and the acid gas characterized by:

1). a first temperature at a central portion of said reaction zone;

2). a second temperature toward the lower end of said reaction zone which is lower than the temperature of said central portion;

3). a third temperature toward the upper end of said reaction zone which is lower than the temperature of said central portion; and b) controlling the relative flow rates of the feed gas and the amine through the absorber in response to said first, second, and third temperatures to maintain said reaction zone at a location spaced from both the upper and lower ends of the absorber.

5. The method of claim 4 wherein the controlling step includes maintaining said third temperature at not less than about 10° F. below said first temperature, and said second temperature at least about 3° F. below said first temperature.

6. The method of claim 4 wherein the amine is an alkanolamine.

7. The method of claim 4 wherein the amine is diethanol amine.

8. A process for reducing the concentration of an acid gas component of a gas stream comprising:

a) countercurrently contacting a gas stream containing an acid gas with a stream of a aqueous amine in a vessel under conditions to create an exothermic zone of reaction within the vessel;

b) substantially continuously monitoring the temperature with said vessel at each of at least three separate points spaced along the vessel to detect the location of said zone in said vessel, said separate points including at least a mid-point and two opposite end points; and controlling the flow rate of said amine relative to said gas in said vessel in response to the temperature difference between said mid-point and at least one of said end points to maintain a temperature profile along said zone such that the temperature proximate said mid-point of said zone is higher than the temperatures at said end points of said zone.

9. The process of claim 8 wherein said flow rate of said amine is controlled in response to the temperature difference between said mid-point and both of said end points.

10. The process of claim 8 wherein the alkanolamine is monoethanolamine, diethanolamine, triethanolamine, diglycoloamine, methyldiethanolamine, diisopropylamine, or mixtures thereof.

11. The process of claim 9 wherein the alkanolamine is monoethanolamine, diethanolamine, triethanolamine, diglycolamine, methyldiethanolamine, diisopropylamine, or mixtures thereof.

12. A method of controlling an exothermic deacidification process in which an aqueous amine is contacted with a feed gas containing an acid gas in a vertically disposed absorber to absorb acid gases from said feed gas, and wherein said amine enters an upper end of said absorber and exits a lower end of said absorber, and said feed gas enters said lower end of said absorber and exits said upper end of said absorber, which method comprises:

a) substantially continuously monitoring temperatures within said absorber at least three points spaced along said absorber intermediate said upper and lower ends to detect a reaction zone between said amine and said acid gas characterized by:

1) a first temperature at a central portion of said reaction zone;

2) a second temperature toward said lower end of said reaction zone which is lower than the temperature of said central portion;

3) a third temperature toward said upper end of said reaction zone which is lower than the temperature of said central portion; and b) controlling the relative flow rates of said feed gas and said amine through said absorber in response to the temperature difference between said first temperature and at least one of said second or said third temperature to maintain said reaction zone at a location spaced from both said upper and lower ends of the absorber.

13. The method of claim 12 wherein said relative flow rates of said feed gas and said amine are controlled in response to the temperature difference between said first temperature and both of said second and third temperatures.

14. The method of claim 12 wherein said controlling step includes maintaining said third temperature at not less than about 10° F. below said first temperature, and said second temperature at least about 3° F. below said first temperature.

15. The method of claim 12 wherein said amine is an alkanolamine.

16. The method of claim 12 wherein said amine is a diethanol amine.

* * * * *